United States Patent
Kollar et al.

(10) Patent No.: US 9,844,024 B2
(45) Date of Patent: Dec. 12, 2017

(54) DETERMINATION OF THE REAL TRACKING-AREA WHEN DYNAMIC-TA TECHNIQUES ARE APPLIED

(71) Applicant: Nokia Solutions and Networks Oy, Espoo (FI)

(72) Inventors: Martin Kollar, Kosice (SK); Fan Teng, Redmond, WA (US); Yi Zhi Yao, Beijing Beijing (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/115,835

(22) PCT Filed: Dec. 11, 2014

(86) PCT No.: PCT/EP2014/077370
§ 371 (c)(1),
(2) Date: Aug. 1, 2016

(87) PCT Pub. No.: WO2015/128020
PCT Pub. Date: Sep. 3, 2015

(65) Prior Publication Data
US 2017/0181121 A1     Jun. 22, 2017

(30) Foreign Application Priority Data
Feb. 28, 2014  (EP) .................................. 14157230

(51) Int. Cl.
*H04W 68/00*  (2009.01)
*H04W 68/02*  (2009.01)
(Continued)

(52) U.S. Cl.
CPC ........... *H04W 68/02* (2013.01); *H04W 24/02* (2013.01); *H04W 68/005* (2013.01);
(Continued)

(58) Field of Classification Search
CPC ..... H04W 60/00; H04W 64/00; H04W 68/02; H04W 68/025
(Continued)

(56) References Cited

U.S. PATENT DOCUMENTS

2007/0232317 A1* 10/2007 Casati .................. H04W 68/02
455/450
2010/0220680 A1   9/2010 Ramankutty et al.
(Continued)

FOREIGN PATENT DOCUMENTS

EP     1301052 A2    4/2003
JP     2003-143643 A  5/2003
(Continued)

OTHER PUBLICATIONS

"3rd Generation Partnership Project;Technical Specification Group Radio Access Network;Evolved Universal Terrestrial Radio Access (E-UTRA);Radio Resource Control (RRC); Protocol specification(Release 11)", 3GPP TS 36.331, V11.6.0, Dec. 2013, pp. 1-349.
(Continued)

*Primary Examiner* — Charles Appiah
*Assistant Examiner* — Jaime Holliday
(74) *Attorney, Agent, or Firm* — Squire Patton Boggs (US) LLP

(57) ABSTRACT

When the operator of a mobile communication system applies one of: "dynamic Tracking Area List" or "smart paging" for more efficient paging, the "real" size of the Tracking Area, i. e., the number of cells over which a S1AP-paging is broadcasted on average, becomes difficult to calculate in real time; A method of determining tracking area size information is therefore proposed comprising: obtaining the average number of paging records per cell, and dividing it by average number of RRC-Connection-Setup, for termi- (Continued)

nated calls, per cell; the result is proportional to the real TA size; the obtained value is proposed as a new KPI, Key Performance Indicator.

14 Claims, 9 Drawing Sheets

(51) Int. Cl.
　　　*H04W 24/02* (2009.01)
　　　*H04W 60/00* (2009.01)
　　　*H04W 64/00* (2009.01)
(52) U.S. Cl.
　　　CPC ............ *H04W 60/00* (2013.01); *H04W 64/00* (2013.01); *H04W 68/025* (2013.01)
(58) Field of Classification Search
　　　USPC .................................................. 455/458, 515
　　　See application file for complete search history.

(56) References Cited

U.S. PATENT DOCUMENTS

| | | | |
|---|---|---|---|
| 2010/0331011 A1 | 12/2010 | Vikberg et al. | |
| 2011/0294524 A1* | 12/2011 | Tontinuttananon ... | H04W 60/00 455/458 |
| 2014/0155109 A1* | 6/2014 | Vaidya .................... | H04W 8/06 455/458 |

FOREIGN PATENT DOCUMENTS

| | | |
|---|---|---|
| JP | 2008-193365 A | 8/2008 |
| JP | 2012-517738 A | 8/2010 |
| WO | 2013022310 A2 | 2/2013 |
| WO | 2013149595 A1 | 10/2013 |

OTHER PUBLICATIONS

"3rd Generation Partnership Project; Technical Specification Group Services and System Aspects; Telecommunication management; Key Performance Indicators (KPI) for Evolved Universal Terrestrial Radio Access Network (E-UTRAN): Definitions (Release 11)", 3GPP TS 32.450, V11.0.0, Sep. 2012, pp. 1-17.

"3rd Generation Partnership Project; Technical Specification Group Services and System Aspects; Telecommunication management; Key Performance Indicators (KPI) for Evolved Universal Terrestrial Radio Access Network (E-UTRAN); Requirements (Release 11)", 3GPP TS 32.451, V11.0.0, Sep. 2012, pp. 1-13.

"3rd Generation Partnership Project; Technical Specification Group Services and System Aspects; Telecommunication management; Performance Management (PM); Performance measurements Evolved Universal Terrestrial Radio Access Network (E-UTRAN) (Release 12)", 3GPP TS 32.425, V12.0.0, Jun. 2013, pp. 1-74.

Extended European Search Report received for corresponding European Patent Application No. 14157230.5, dated Jul. 30, 2014, 8 pages.

Xie et al., "Dynamic Location Area Management and Performance Analysis", 43rd IEEE Vehicular Technology Conference, May 18-20, 1993, pp. 536-539.

International Search Report and Written Opinion received for corresponding Patent Cooperation Treaty Application No. PCT/EP2014/077370, dated Mar. 30, 2015, 13 pages.

Japanese Office Action dated Sep. 25, 2017, issued in corresponding JP Application No. 2016-554283.

* cited by examiner

DETERMINATION OF THE REAL TRACKING-AREA WHEN DYNAMIC-TA TECHNIQUES ARE APPLIED

RELATED APPLICATION

This application was originally filed as PCT Application No. PCT/EP2014/077370 filed Dec. 11, 2014 which claims priority benefit from EP Patent Application No. 14157230.5, filed Feb. 28, 2014.

A communication system can be seen as a facility that enables communication sessions between two or more nodes such as fixed or mobile devices, machine-type terminals, access nodes such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how devices shall communicate, how various aspects of communications shall be implemented and how devices for use in the system shall be configured.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a device such as a user equipment is used for enabling receiving and transmission of communications such as speech and content data.

Communications can be carried on wireless carriers. Examples of wireless systems include public land mobile networks (PLMN) such as cellular networks, satellite based communication systems and different wireless local networks, for example wireless local area networks (WLAN). In wireless systems a communication device provides a transceiver station that can communicate with another communication device such as e.g. a base station of an access network and/or another user equipment. The two directions of communications between a base station and communication devices of users have been conventionally referred to as downlink and uplink. Downlink (DL) can be understood as the direction from the base station to the communication device and uplink (UL) the direction from the communication device to the base station.

According to a first aspect, there is provided a method comprising determining tracking area size information in a mobile communication system in dependence of paging request information and mobile connection information.

The method may comprise collecting the paging request information and the mobile connection information in an area and a time interval.

The paging request information may be the number of paging requests in the area in the time interval.

The mobile connection information may be the number of connection setup attempts in the area in the time interval.

The area may be one of a public land mobile network area, a tracking area, a plurality of tracking areas, an area covered by a base station and an area covered by a cell of a base station.

The method may further comprise determining the tracking area size information comprises determining a ratio in dependence of the paging request information and the mobile connection information.

The tracking area size information may indicate information related to one of the number of base stations of the tracking area in the mobile communication system and the number of cells of the tracking area in the mobile communication system.

The method may further comprise collecting at least one of the paging request information and the mobile connection information.

The method may further comprise performing the method at one of a management entity, a core network node, a control entity, a network management node or a base station.

In a second aspect there is provided an apparatus comprising means for determining tracking area size information in a mobile communication system in dependence of paging request information and mobile connection information.

The apparatus may comprise means for collecting the paging request information and the mobile connection information in an area and a time interval.

The paging request information may be the number of paging requests in the area in the time interval.

The mobile connection information may be the number of connection setup attempts in the area in the time interval.

The area may be one of a public land mobile network area, a tracking area, a plurality of tracking areas, an area covered by a base station and an area covered by a cell of a base station.

The apparatus may further comprise means for determining the tracking area size information comprises determining a ratio in dependence of the paging request information and the mobile connection information.

The tracking area size information may indicate information related to one of the number of base stations of the tracking area in the mobile communication system and the number of cells of the tracking area in the mobile communication system.

The apparatus may further comprise means for collecting at least one of the paging request information and the mobile connection information.

The apparatus may further comprise means for performing the method at one of a management entity, a core network node, a control entity, a network management node or a base station.

In a third aspect there is provided an apparatus, said apparatus comprising at least one processor and at least one memory including computer code for one or more programs, the at least one memory and the computer code configured, with the at least one processor, to cause the apparatus at least to determine tracking area size information of a tracking area in a mobile communication system in dependence of paging request information and mobile connection information.

The at least one processor and at least one memory may be configured to collect the paging request information and the mobile connection information in an area and a time interval.

The paging request information may be the number of paging requests in the area in the time interval.

The mobile connection information may be the number of connection setup attempts in the area in the time interval.

The area may be one of a public land mobile network area, a tracking area, a plurality of tracking areas, an area covered by a base station and an area covered by a cell of a base station.

The at least one processor and at least one memory may be configured to determine the tracking area size information comprises determining a ratio in dependence of the paging request information and the mobile connection information.

The tracking area size information may indicate information related to one of the number of base stations of the tracking area in the mobile communication system and the number of cells of the tracking area in the mobile communication system.

The at least one processor and at least one memory may be configured to collect at least one of the paging request information and the mobile connection information.

The at least one processor and at least one memory may be configured to perform the method at one of a management entity, a core network node, a control entity, a network management node or a base station.

In a fourth aspect there is provided a computer program comprising program code means adapted to perform the method of the first aspect may also be provided. The computer program may be stored and/or otherwise embodied by means of a carrier medium.

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 to 3 to assist in understanding the technology underlying the described examples.

Figure 1:
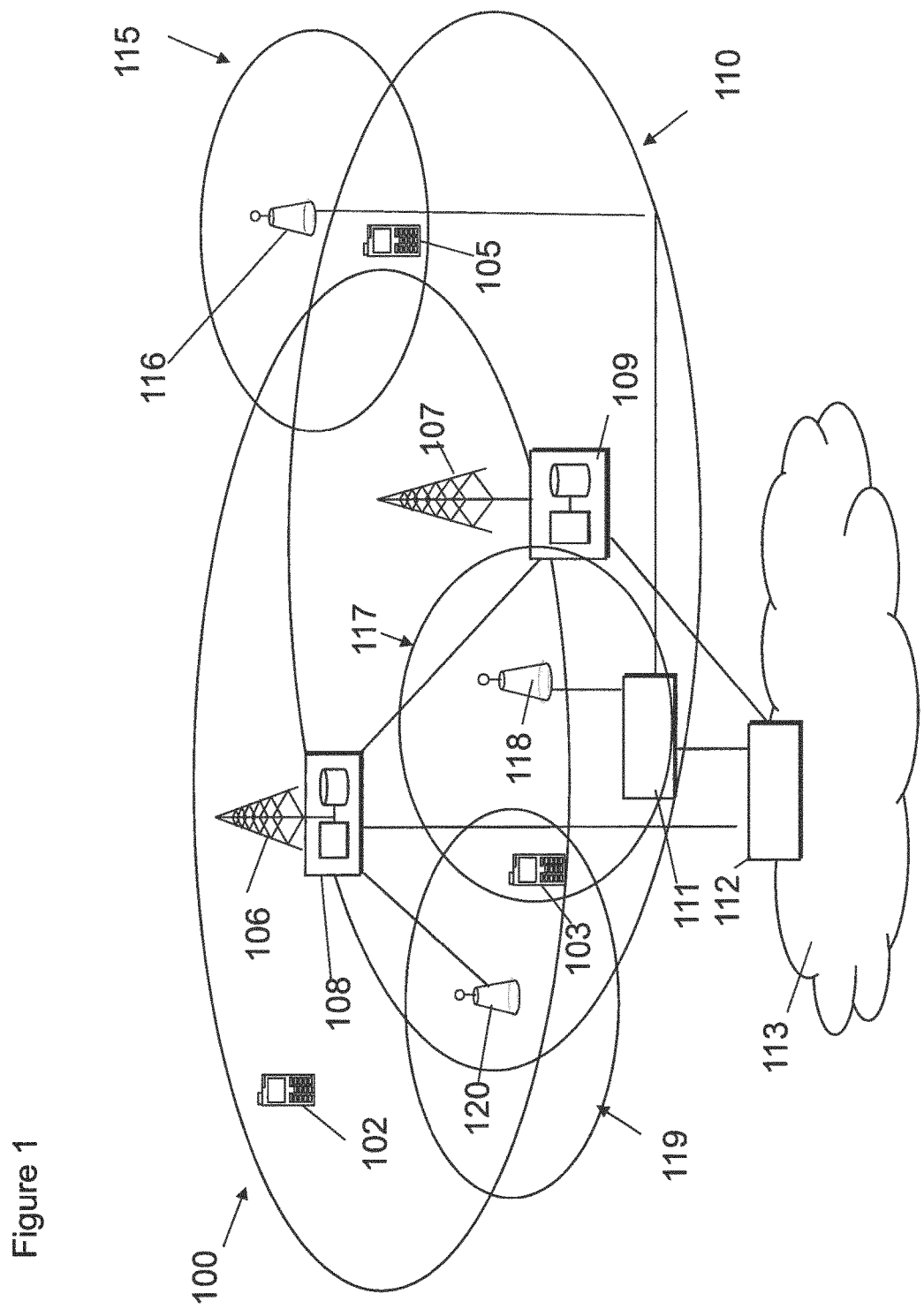
FIG. 1 shows a schematic diagram of a communication system comprising base stations and a plurality of communication devices.

FIG. 1 shows a wireless communication system 100 where mobile communication devices or user equipment (UE) 102, 103, 105 are provided with wireless access via at least one base station, access point or similar wireless transmitting and/or receiving node or point. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (not shown) and may be implemented as one central apparatus or its functionality may be distributed over several apparatus, Base stations may comprise base band pools. The controller apparatus may be part of the base station and/or provided by a separate entity such as for example a Radio Network Controller in the radio access network. In FIG. 1 control apparatus 108 and 109 are shown to control the respective base stations 106 and 107, which may be for example macro, pico or femto base stations. The control apparatus of a base station can be interconnected with other control entities. The control apparatus is typically provided with memory capacity and at least one data processor. The control apparatus and functions may be distributed between a plurality of control units. In some systems, the control apparatus may additionally or alternatively be provided in a radio network controller.

In FIG. 1 base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro stations. In the example, stations 116 and 118 are connected via a gateway 111 whilst station 120 connects via the controller apparatus 108. In some embodiments, the smaller stations may not be provided.

Figure 2:
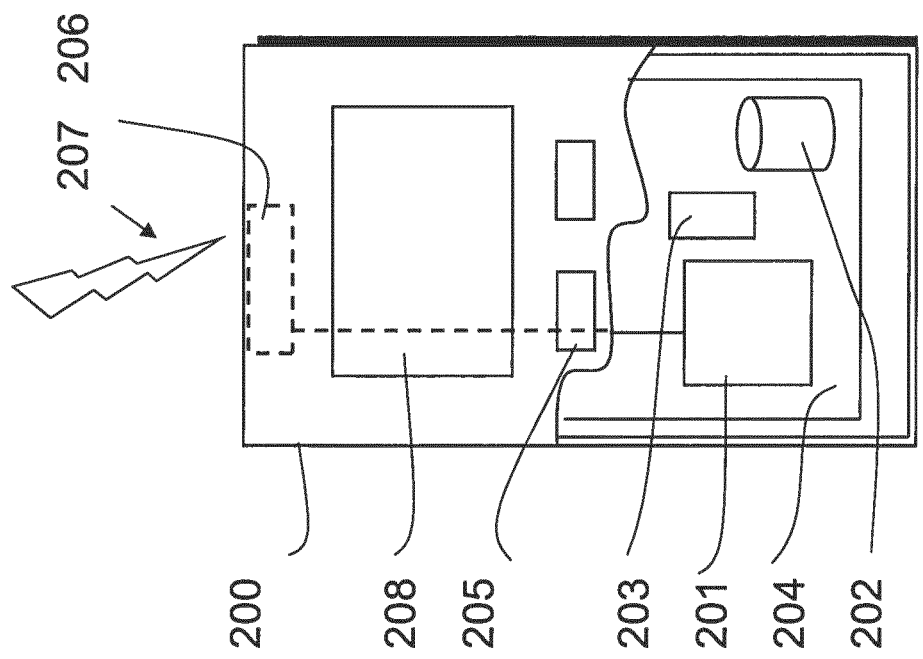
FIG. 2 shows a schematic diagram of a mobile communication device according to some embodiments.

A possible mobile communication device will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The mobile device 200 may receive signals over an air or radio interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

The communication devices 102, 103, 105 may access the communication system based on various access techniques, such as code division multiple access (CDMA), or wideband CDMA (WCDMA). Other non-limiting examples comprise time division multiple access (TDMA), frequency division multiple access (FDMA) and various schemes thereof such as the interleaved frequency division multiple access (IF-DMA), single carrier frequency division multiple access (SC-FDMA) and orthogonal frequency division multiple access (OFDMA), space division multiple access (SDMA) and so on.

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 3:
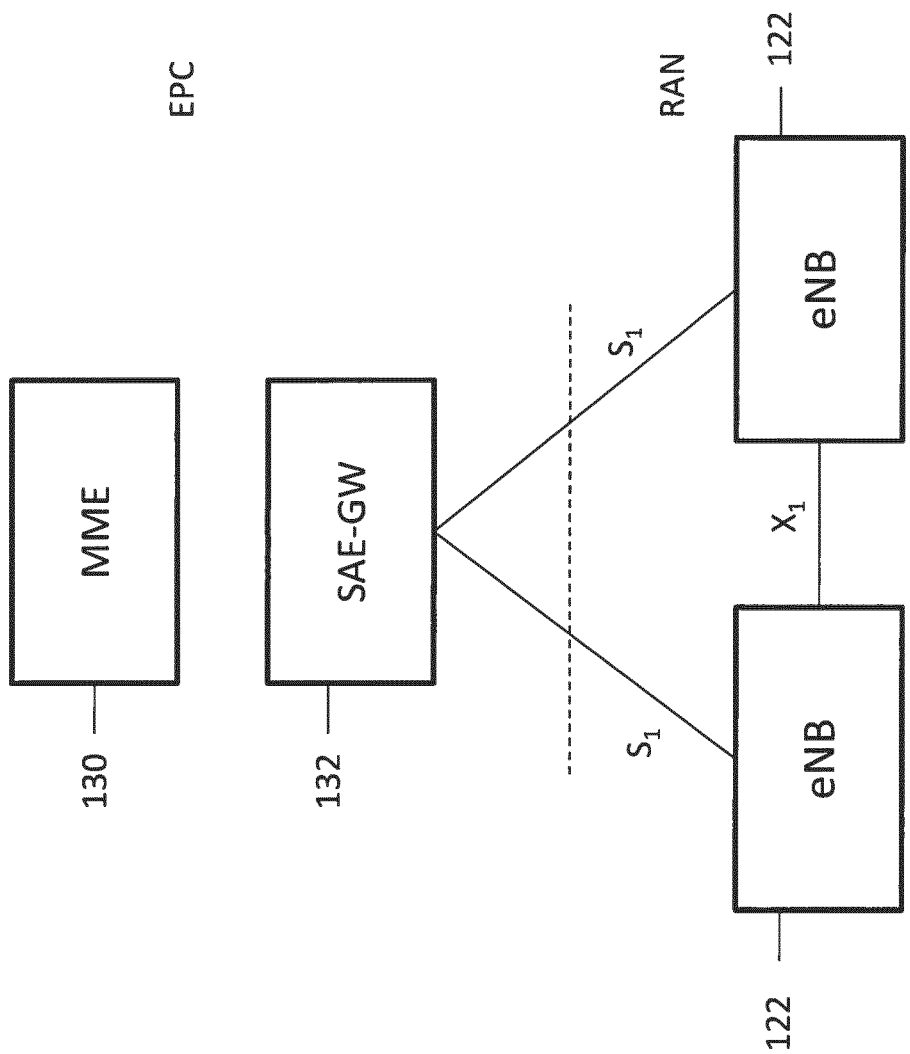
FIG. 3 shows a schematic diagram of a communication system.

As shown in FIG. 3, LTE systems may be considered to have a so-called "flat" architecture, without the provision of RNCs; rather the (e)NB 122 (the LTE base station) is in communication with a system architecture evolution gateway (SAE-GW) and a mobility management entity 130 (MME) which may be located in a core network, which entities may also be pooled meaning that a plurality of these nodes may serve a plurality (set) of (e)NBs. Each UE 102 may be served by one MME 130 and/or S-GW at a time and the (e)NB keeps track of current association. SAE-GW 132 is a "high-level" user plane core network element in LTE, which may consist of the S-GW and the P-GW (serving gateway and packet data network gateway, respectively). The core network may be known as the Evolved Packet Core (EPC). The functionalities of the S-GW and P-GW may be separated and they are not required to be co-located.

A cluster of base stations, such as eNBs 122, having the same Tracking Area Code (TAC) is known as a Tracking Area (TA) 150. Tracking Area (TA) size monitoring is important in live networks as incorrect TA settings may lead to signalling overload both in the E-UTRAN and EPC, and thus degrade overall system performance.

Figure 4:
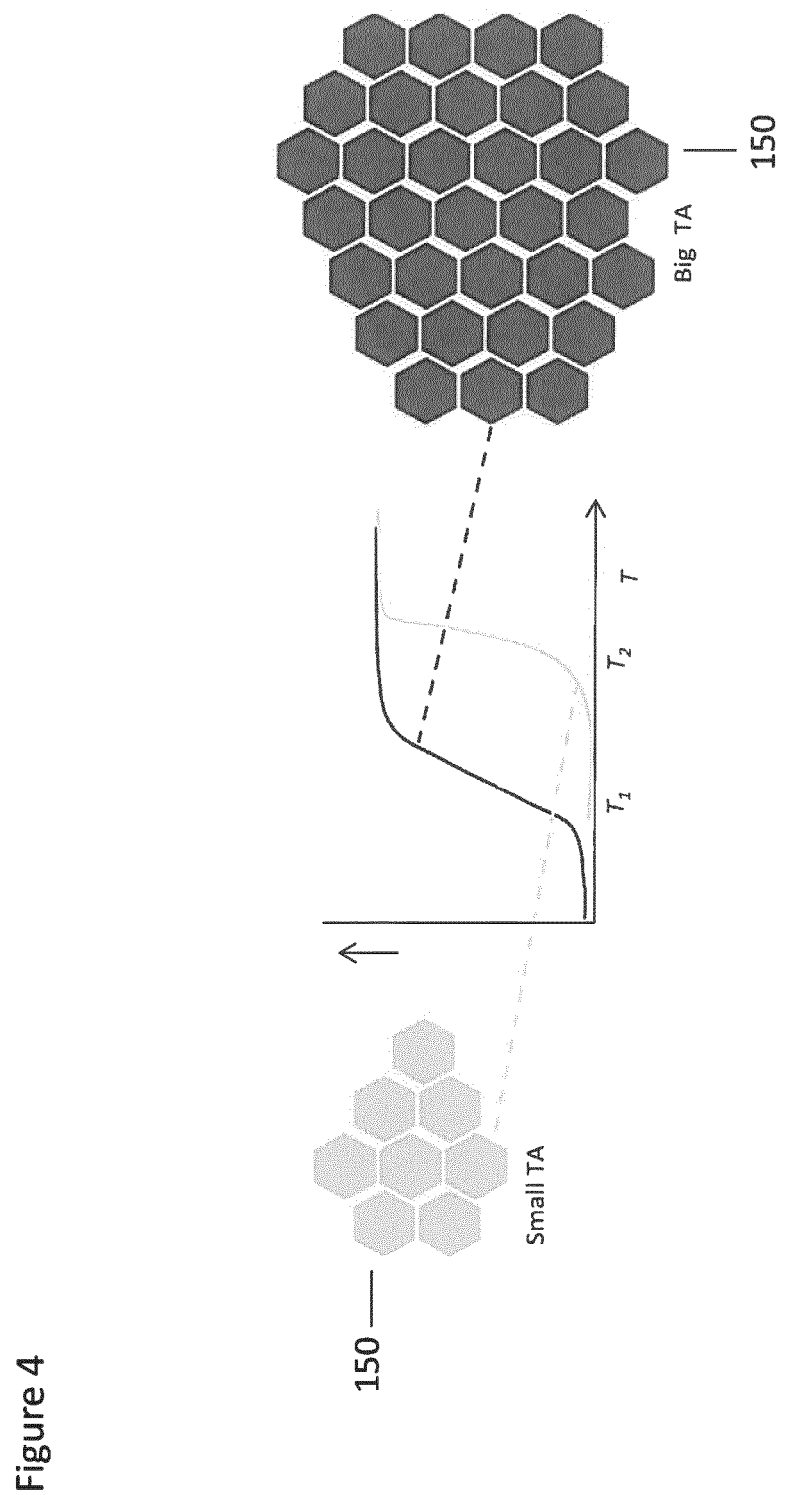
FIG. 4 shows a cumulative distribution function (CDF) of a time period T when at least one paging is sent in a tracking area.

A paging request message for a mobile terminating call is sent in each cell of the TA 150 to which the UE 102 belongs. FIG. 4 shows a CDF of a time period T when at least one paging is sent in the TA. Paging is sent more often in the bigger TA 150 as $T_1 \ll T_2$. The bigger the TA, the higher the probability that a paging request is sent within a time interval T (due to the higher amount of UEs in the bigger tracking area 150), which may lead to a bottleneck on the PCCH (Paging Control Channel) and S1 MME interface if the TA 150 gets too big.

Figure 5:
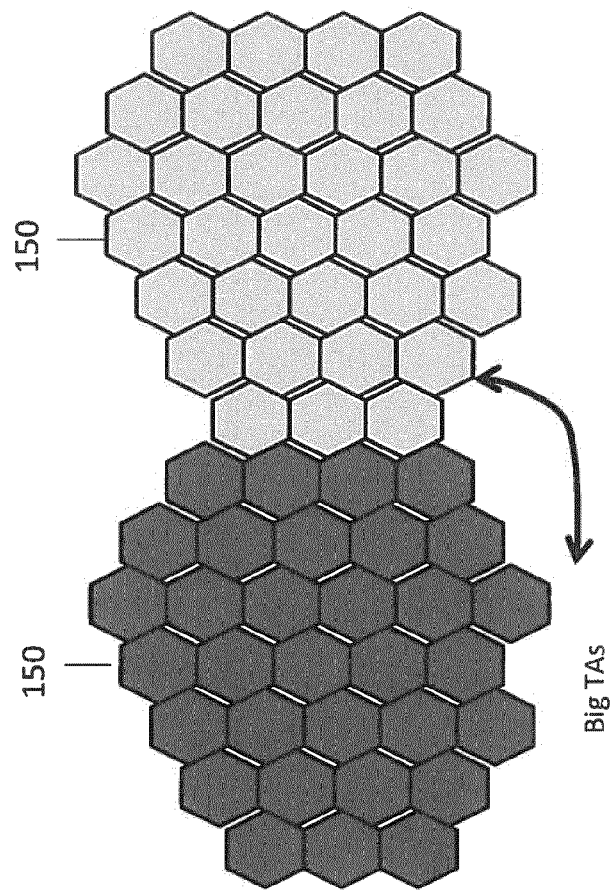
FIG. 5 shows a schematic diagram of the number of updates in tracking areas of differing sizes.
Figure 5:
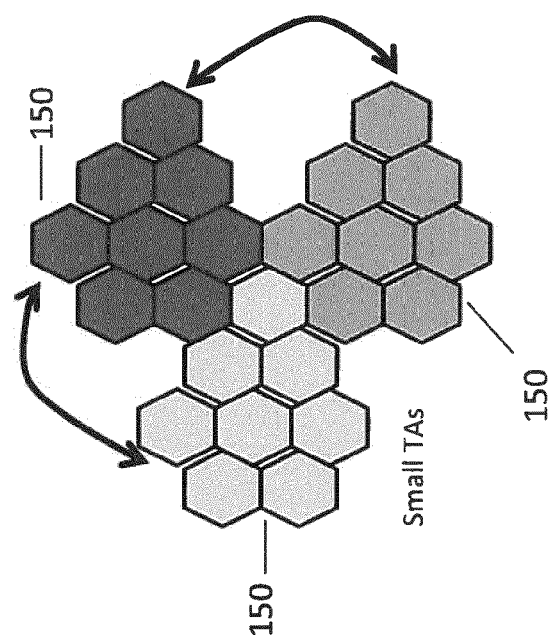

As shown in FIG. 5, if the TAs 150 are too small, the number of TA updates, performed when a UE 102 is moving between different TAs 150, increases which may lead to a bottleneck on the Common Control Channel (CCCH) and/or lack of preambles in the S1 MME interface with the eNB 122 and/or increased UE battery consumption and a non-negligible part of the total transmitted data volume being consumed for TA update purposes.

In VoLTE (Voice over LTE) with CSFB (Circuit Switched Fallback), TA to LA (location area) mapping is maintained in the MME 130. The mapping is required as it is used by the MME 130 to attempt to predict which Mobile Switching Centre (MSC) a UE 102 would attach to if CSFB is invoked in the event of a mobile terminating voice call. As this mapping needs to be as accurate as possible, the operator may tune the TA size, which may lead to TA to LA mapping issues if the TA size becomes too big or too small.

Figure 6:
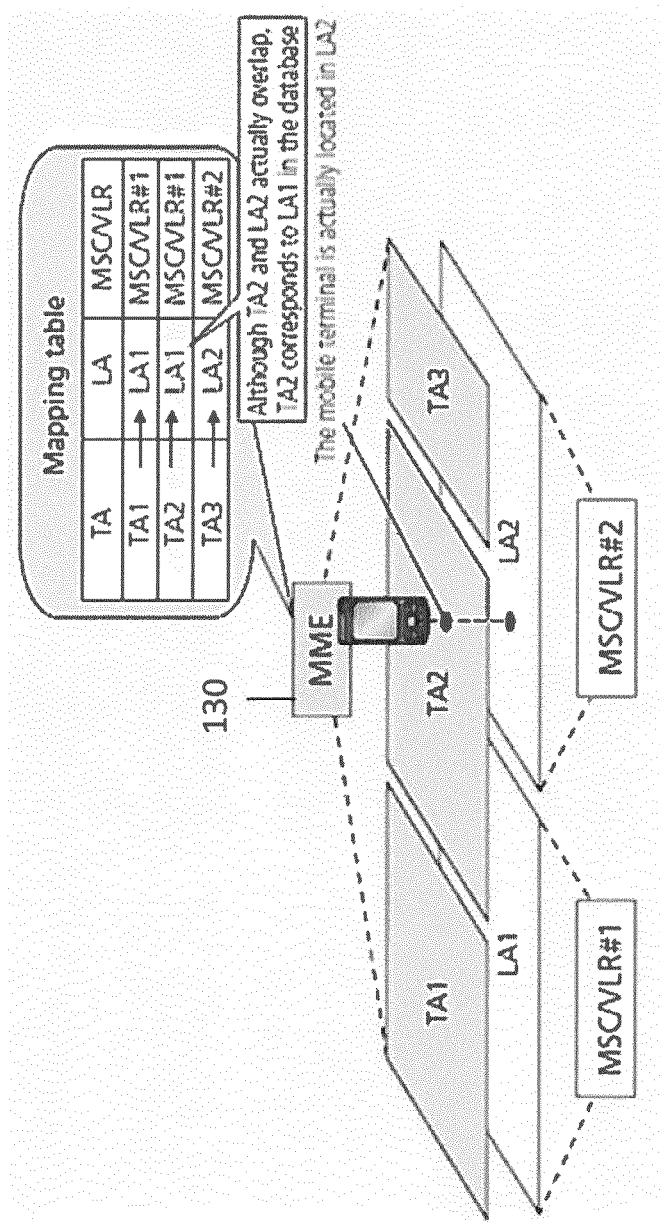
FIG. 6 shows a schematic diagram of tracking area to location area mapping.

FIG. 6 shows an example of TA to LA mapping.

The TA size may be monitored by calculating the average number of eNBs 122 (or cells) assigned to the TA. This requires downloading a large amount of configuration data either directly from the EPC or from the OSS (Operations Support System). However, the E-UTRAN and EPC may be provided by different vendors which makes the downloading and calculating difficult. Checks carried out by the EPC are not straightforward.

Additionally, the operator may use alternative techniques in the EPC such as a dynamic TA list which consist of multiple TAs 150. Those TA lists follow a cyclic slide window pattern and enables uniform distribution of the signalling load in the network, avoiding high overloading on only a few cells. Another technique, known as the smart paging feature, is based on sending the paging request into a smart TA list consisting of eNBs 122 where the UE 102 is expected to be located with a high probability, instead of sending the paging request into the whole TA.

In order to discover possible issues resulting from the TA size when these alternative techniques are used, the so called real TA size, i.e. the size given by the number of cells into which a paging request is sent when the UE 102 is called, shall be monitored. In the case of the dynamic TA list, the real TA size is the size represented by all the TAs included in the dynamic TA list, i.e. it may be higher than the simple TA size obtained from configuration. In the case of smart paging, the real TA size is represented by the cells included in the smart TA, i.e. it may be less than the simple TA size obtained from configuration.

Monitoring of the simple TA size is possible but time consuming as it requires downloading a large amount of configuration data either directly from the EPC or from the OSS. However, it is desirable to check the TA size quickly and have a straightforward interaction with the EPC side, especially if the E-UTRAN and EPC are provided by different vendors. The fact that an operator may use alternative techniques increases the complexity of monitoring the real TA size, as well as making it more time consuming and difficult to obtain the real TA size from configuration data. Therefore it would be useful to be able to perform TA size measurement in the E-UTRAN side. The TA size issues may have an impact on the E-UTRAN as well as the EPC. A tool to monitor the TA size and allow preventative actions to be taken is desirable.

Figure 7:
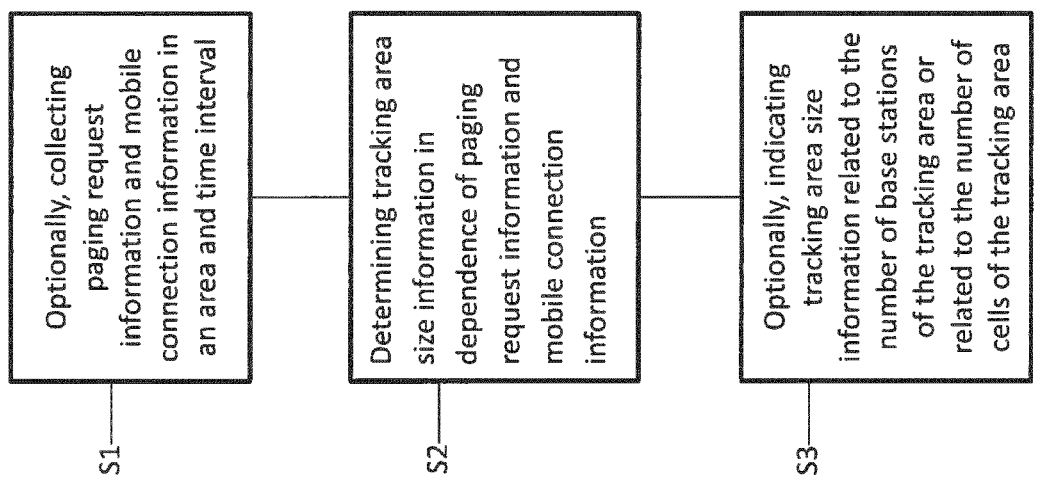
FIG. 7 shows a flow chart of a method of determining tracking area size information.

FIG. 7 shows a method which may be used to monitor TA list size in E-UTRAN. The TA list represents the list of TAs

150, indicating to the UE 102 where its registration is valid. Using a standard paging functionality, where the paging request (record) message for a mobile terminating call is sent in each cell of the TA list to which the UE 102 belongs, the total number of paging request messages sent, for example, in a cell during an observation period T is $$PagingRecords = N*M*K \quad (1)$$

where N is the average size of the TA list, M is the average number of cells in each TA 150 and K is the average number of terminated calls per cell per observation period T.

The average number of terminating calls in the cell, K, may be provided by RRC Connection Setup Attempts related to Mobile Terminated calls measured according to the definition in the 3GPP specification TS 32.425 chapter 4.1.1 by e.g. the base station. Thus:

$$(PagingRecords)/(RRC\ Connection\ Setup\ Attempts\ related\ to\ Mobile\ Terminated\ calls) = (N*M*K)/K \quad (2)$$

which is equal to averaged size of real TA size, i.e. N×M cells.

In the above example the "PagingRecords" and the "number of terminated calls (K)" of an area "equaling a cell" are calculated/measured. In further examples the area can be varied to for example an area covered by a base station, all base stations of a tracking area 150, a PLMN area or a larger area for example a cluster, or any area in-between.

The real TA size for the above example may be obtained from configuration data in the EPC but the relationship between each cell/eNB 122 and the assigned TAC of the TA list must be known. Then it is needed to calculate the size of each TA list and then an average from the obtained results. A large amount of configuration data is utilized, whereas the proposed method enables real TA size calculation via a formula (2), and in E-UTRAN.

In another example, where the operator has activated smart paging functionality in the EPC, the TA list and size of each TA 150 is similar to the previous example, i.e. equal to N and M, respectively, and the average number of terminated calls per cell is K per observation period T. However the paging request (record) is sent into a smart TA list consisting of the eNBs 122 where the UE 102 is expected to be located with a high probability instead of the whole TA list. The smart TA list is equal to X cells where X<<N×M. The total number of paging request messages sent in a cell during the observation period T is $$PagingRecords = X*K \quad (3)$$

Since the average number of terminating calls in the cell is K which may be provided by RRC Connection Setup Attempts related to Mobile Terminated calls measured according to definition mentioned 3GPP specification TS 32.425 chapter 4.1.1 one can write that $$(PagingRecords)/(RRC\ Connection\ Setup\ Attempts\ related\ to\ Mobile\ Terminated\ calls) = (X*K)/K \quad (4)$$

which is equal to average real TA size, in this case, equal to X cells. The real TA size in this example could not be obtained from configuration data as in the previous example.

The above method enables measurement of the real TA size in the E-UTRAN side where the measurement of the real TA size is based on the number of paging records per RRC Connection Setup Attempts related to Mobile Terminated calls (this ratio may be referred to as the Key Performance Indicator (KPI)) where "number of paging records" measurement shall provide the number of paging records message sent to the UE 102. The measurement is triggered by the PagingRecord defined within the Paging Message in the 3GPP Specification TS 36.331 (chapter 6.2.2). The "RRC Connection Setup Attempts related to Mobile Terminated calls" shall be measured according to the definition mentioned in 3GPP specification TS 32.425 Specification chapter 4.1.1 (RRC.ConnEstabAtt.Cause for Cause equal to MT calls).

It may be possible to collect (S1) the number of paging records and RRC Connection Setup Attempts related to Mobile Terminated calls for a single cell in an observation period T and use this information to determine the KPI (S2). However, the number of call terminated attempts in the observation period T may differ from cell to cell which may result in statistically unreliable results. There may be some cells in which the number of terminated calls is larger or smaller than the considered K per observation period T. The number of setup attempts may be measured in each cell of an eNB 122, for all cells of an eNB 122, or for eNBs 122 in a tracking area 150, PLMN area or a larger area such as a cluster. The results may then be aggregated respectively. That is, the KPI may be calculated per bigger objects such as the whole PLMN, when the number of paging records summed over all cells in the PLMN is divided with the number of RRC Connection Setup Attempts related to Mobile Terminated calls summed over all cells in the PLMN such that the obtained results are statistically reliable and show the averaged real TA size measured in the number of cells, which may be then converted to the number of base stations by dividing the averaged real TA size measured in the number of cells by the average number of cells per base station (S3).

Figure 8:
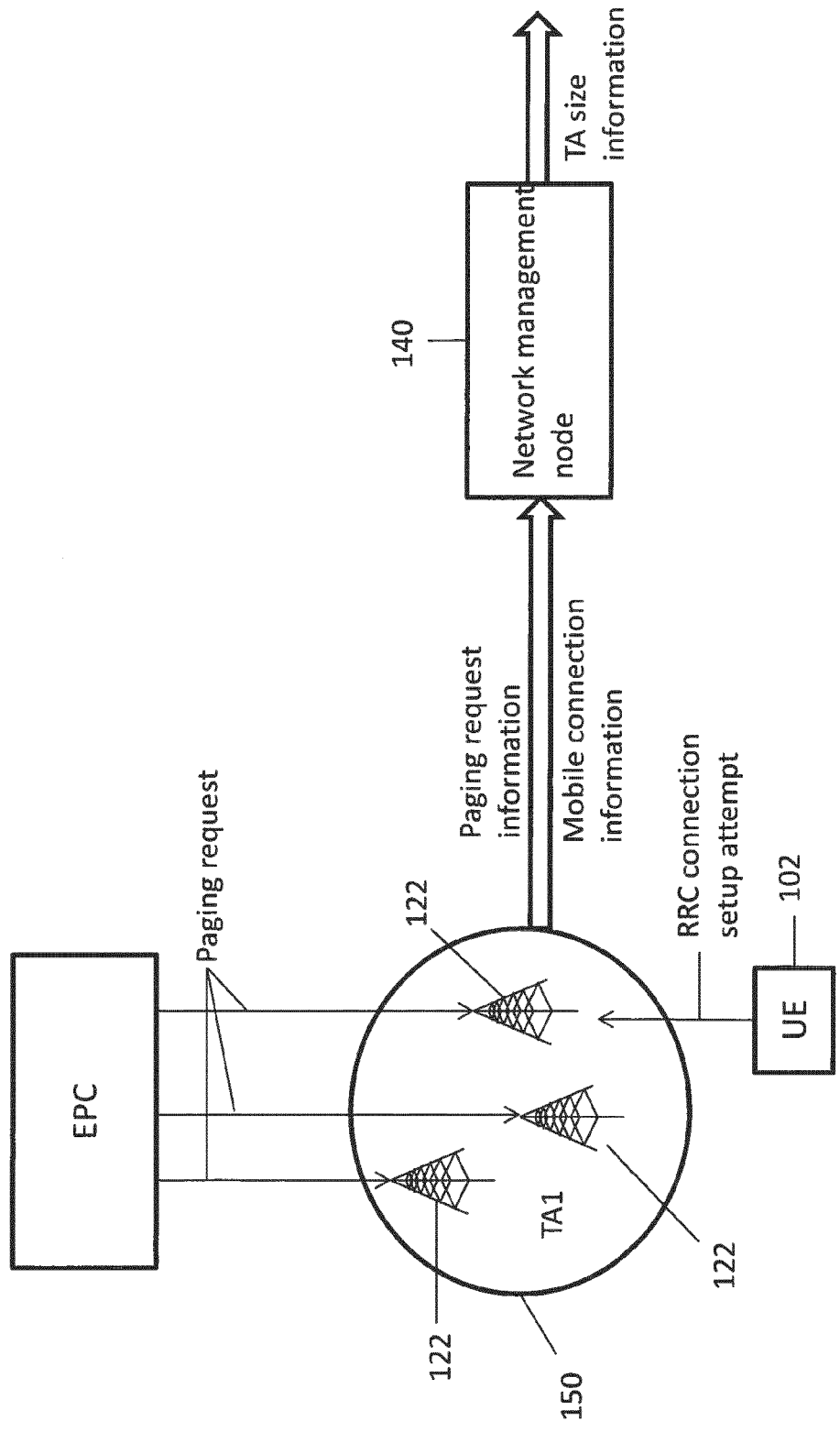
FIG. 8 shows a schematic diagram of network elements according to some embodiments.

As shown in FIG. 8, a network management node 140 may receive the collected information related to the number of paging records and RRC Connection Setup Attempts related to Mobile Terminated calls. The KPI may be calculated (S2) offline. The KPI may be calculated at the network management node 140.

Table 1 shows a method for real TA size measurement implemented using the KPI:

TABLE 1

| | |
|---|---|
| KPI name | E-UTRAN Paging Records per RRC Connection Setup Attempts for MT cause |
| Description | This KPI describes the number of Paging Records per RRC Connection Setup Attempt for MT cause and measures averaged real TA size in the number of cells. |
| Note | |
| KPI logical formula | PagingsPerRRCSetupMT = (transmitted RRC paging records/RRC Connection Setup Attempts (MT))) |
| KPI category | Accessibility |
| Unit | None |
| Elementary Object | PLMN |

Figure 9:
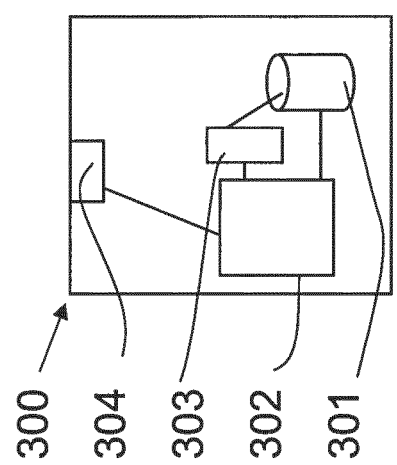
FIG. 9 shows a schematic diagram of a control apparatus according to some embodiments.

FIG. 9 shows an example of a control apparatus for a communication system, for example to be coupled to and/or for controlling a station of an access system, such as a base station or an access point. In some embodiments, base stations comprise a separate control apparatus. In other embodiments, the control apparatus can be another network element such as a radio network controller or a core network element. In some embodiments, each base station may have such a control apparatus as well as a control apparatus being provided in a radio network controller or in a core network element. The control apparatus 109 (or the control apparatus in the core network—not shown) can be arranged to provide control on communications in the service area of the system. The control apparatus 109 comprises at least one memory 301, at least one data processing unit 302, 303 and an input/output interface 304. Via the interface the control apparatus can be coupled to a receiver and a transmitter of the base station. The control apparatus may be used to calculate the KPI. The control apparatus may be part of a network management system or the control apparatus may provide the calculated KPI to the network management system. The KPI may be calculated in a performance network management node.

The required data processing apparatus and functions of a base station apparatus, a communication device, and any other appropriate apparatus (e.g. a control apparatus) may be provided by means of one or more data processors. The described functions may be provided by one or more processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. In general, the various embodiments may be implemented in hardware or special purpose circuits, software, logic or any combination thereof.

Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method comprising:
   determining tracking area size information in a mobile communication system in dependence of paging request information and mobile connection information; and
   collecting the paging request information and the mobile connection information in an area and a time interval,
   wherein the paging request information is the number of paging requests in the area in the time interval, and wherein the mobile connection information is the number of connection setup attempts in the area in the time interval,
   wherein the method further comprises generating a ratio of the number of paging requests and the number of connection setup attempts, and
   wherein the ratio is proportional to an average size of a real tracking area in terms of a number of cells.

2. The method according to claim 1, wherein the area is at least one of a public land mobile network area, a tracking area, a plurality of tracking areas, an area covered by a base station and an area covered by a cell of a base station.

3. The method according to claim 1, wherein determining the tracking area size information comprises determining a ratio in dependence of the paging request information and the mobile connection information.

4. The method according to claim 1, wherein the tracking area size information indicates information related to one of the number of base stations of the tracking area in the mobile communication system and the number of cells of the tracking area in the mobile communication system.

5. The method according to claim 1 comprising performing the method at one of a management entity, a core network node, a control entity, a network management node or a base station.

6. An apparatus comprising:
   at least one processor; and
   at least one memory including compute program instructions,
   wherein the at least one memory and computer program instructions are configured to, with the at least one processor, cause the apparatus at least to:
   determine tracking area size information in a mobile communication system in dependence of paging request information and mobile connection information; and
   collect the paging request information and the mobile connection information in an area and a time interval,
   wherein the paging request information is the number of paging requests in the area in the time interval, and wherein the mobile connection information is the number of connection setup attempts in the area in the time interval,
   wherein the at least one memory and computer program instructions are further configured to, with the at least one processor, cause the apparatus at least to generate a ratio of the number of paging requests and the number of connection setup attempts, and
   wherein the ratio is proportional to an average size of a real tracking area in terms of a number of cells.

7. The apparatus according to claim 6, wherein the area is at least one of a public land mobile network area, a tracking area, an area covered by a base station and an area covered by a cell of a base station.

8. The apparatus according to claim 6, wherein determining the tracking area size information comprises determining a ratio in dependence of the paging request information and the mobile connection information.

9. The apparatus according to claim 6, wherein the tracking area size information indicates information related to one of the number of base stations of the tracking area in the mobile communication system and the number of cells of the tracking area in the mobile communication system.

10. The apparatus according to claim 6, wherein the apparatus is one of a management entity, a core network node, a control entity, a network management node or a base station.

11. A non-transitory computer-readable storage medium including code which when executed on at least one processor provides at least the following:
  determining tracking area size information in a mobile communication system in dependence of paging request information and mobile connection information; and
  collecting the paging request information and the mobile connection information in an area and a time interval,
  wherein the paging request information is the number of paging requests in the area in the time interval, and
  wherein the mobile connection information is the number of connection setup attempts in the area in the time interval,
  wherein the computer-readable storage medium further provides generating a ratio of the number of paging requests and the number of connection setup attempts, and
  wherein the ratio is proportional to an average size of a real tracking area in terms of a number of cells.

12. The computer-readable storage medium according to claim 11, wherein the area is at least one of a public land mobile network area, a tracking area, a plurality of tracking areas, an area covered by a base station and an area covered by a cell of a base station.

13. The computer-readable storage medium according to claim 11, wherein determining the tracking area size information comprises determining a ratio in dependence of the paging request information and the mobile connection information.

14. The computer-readable storage medium according to claim 11, wherein the tracking area size information indicates information related to one of the number of base stations of the tracking area in the mobile communication system and the number of cells of the tracking area in the mobile communication system.

* * * * *